United States Patent

Shirahata et al.

[11] Patent Number: 5,194,305
[45] Date of Patent: Mar. 16, 1993

[54] MOLDINGS AND PROCESS FOR MANUFACTURING THE SAME

[75] Inventors: Itaru Shirahata; Nobuyuki Sawaki, both of Obu, Japan

[73] Assignee: Tokai Kogyo Kaisha, Obu, Japan

[21] Appl. No.: 767,658

[22] Filed: Sep. 30, 1991

[30] Foreign Application Priority Data

Oct. 11, 1990 [JP] Japan .................................. 2-274286

[51] Int. Cl.⁵ ............................................ B60R 13/04
[52] U.S. Cl. .................................... 428/31; 52/716.5; 264/515; 264/516; 293/128; 428/188
[58] Field of Search .............. 428/31, 188; 52/716; 264/515, 516; 293/128

[56] References Cited

U.S. PATENT DOCUMENTS

| | | | |
|---|---|---|---|
| 4,351,868 | 9/1982 | Otani | 428/31 X |
| 4,563,374 | 1/1986 | Treber et al. | 428/31 |
| 4,668,543 | 5/1987 | Schlenz | 428/31 |

*Primary Examiner*—Henry F. Epstein
*Attorney, Agent, or Firm*—Dennison, Meserole, Pollack & Scheiner

[57] ABSTRACT

A molding including a hollow molding body, and an ornamental film layer adhered on the upper surface and the side surfaces of the hollow molding body. The manufacturing process of the molding substantially comprises the steps of forming the hollow molding body by a blow molding method, and adhering the ornamental film layer on the hollow molding body. The adhesion of the ornamental film layer is achieved during formation of the hollow molding body.

9 Claims, 6 Drawing Sheets

MOLDINGS AND PROCESS FOR MANUFACTURING THE SAME

BACKGROUND OF THE INVENTION

The present invention relates to a molding and process for manufacturing the same.

In the automobile industry, conventional solid moldings for use with an automobile are gradually replaced by hollow moldings to reduce the weight of the automobile. Such hollow moldings are manufactured by a blow molding method.

As well known, the blow molding method comprises the steps of extruding molding material to form a parison in a forming cavity of a blow molding die, and feeding air pressure into the parison to form a hollow product.

A problem usually associated with the hollow molding formed by the blow molding method is that the outer surface of the hollow molding is generally formed with stripe-like irregularities which result from nonuniform flowing of the molding material. This may lead to undesirable awkward appearance of the hollow molding.

SUMMARY OF THE INVENTION

It is an object of the invention to provide a hollow molding which may exhibit a good appearance.

It is another object of the invention to provide a manufacturing process of the hollow molding which may exhibits a good appearance.

According to the present invention, there is provided a hollow molding which comprises a hollow molding body formed by a blow molding method, and an ornamental film layer adhered on the upper surface and the side surfaces of the hollow molding body. The adhesion of the ornamental film layer is achieved during formation of the hollow molding body.

According to the present invention, there is provided a process for manufacturing a hollow molding which includes a hollow molding body and an ornamental film layer adhered on the upper surface and the side surfaces of the hollow molding body. The process comprises the steps of providing a molding die including a first molding die member having a first molding surface to form the upper and side surfaces of the hollow molding body and including a second molding die member having a second molding surface to form the bottom surface of the hollow molding body; moving the molding die to an open position in which the first and second molding die members are separated from each other; arranging a film material to be formed to the ornamental film layer so as to cover the first molding surface of the first molding die member; extruding molding material to form a parison to be formed to the hollow molding body between the film material and the first molding surface of the first molding die member; moving the molding die to a closed position in which the first and second molding die members are in contact with each other; and feeding air pressure into the parison for forming the hollow molding body and simultaneously to adhere the film material on the upper and side surfaces of the hollow molding body for forming the ornamental film layer thereon.

An important feature of the present invention is that the outer surface of the molding body is applied with the ornamental film to conceal irregularities formed on the outer surface of the molding body, thereby offering the advantage that the hollow molding exhibits a good appearance.

Another feature of the present invention is that the process easily provides a hollow molding which comprises a molding body and an ornamental film bonded to the outer surface of the molding body.

The present invention will become more fully apparent from the claims and the description as it proceeds in connection with the drawings.

DETAILED DESCRIPTION OF THE PREFERRED EMBODIMENTS

Figure 1:
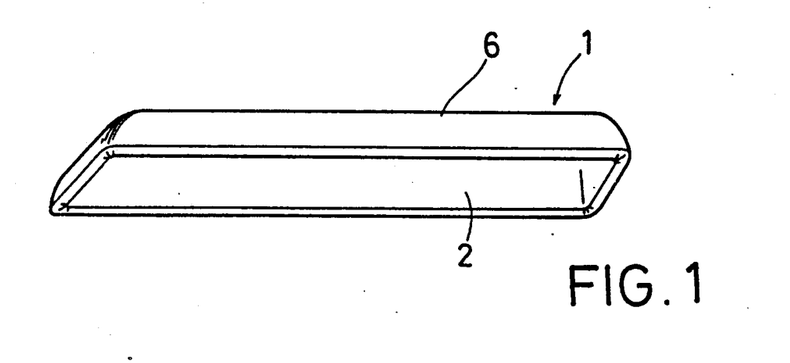
FIG. 1 is a perspective view of a hollow molding according to a first embodiment of the present invention.
Figure 2:
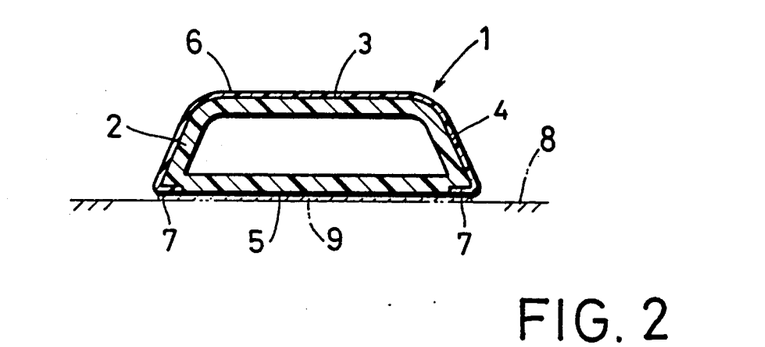
FIG. 2 is a sectional view of the hollow molding.
Figure 3:
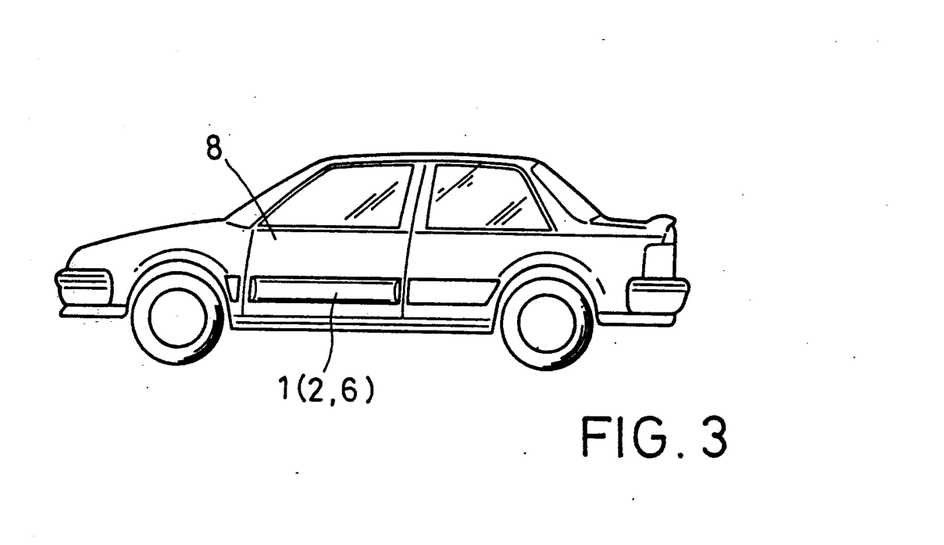
FIG. 3 is a schematic illustration of an automobile mounting the hollow molding.

Referring to FIGS. 1 to 3, shown therein is a hollow molding 1 according to a first embodiment of the invention.

As shown in FIGS. 1 and 2, the hollow molding 1 comprises a hollow molding body 2 and an ornamental film 6 adhered on an upper surface 3 and side surfaces 4 of the molding body 2. As best shown in FIG. 2, the circumferential edge of the ornamental film 6 is folded toward a bottom surface 5 of the molding body 2 to form a folded edge 7.

The hollow molding body 2 is formed of thermoplastic synthetic resin such as polyethylene, polypropylene and a mixture of polyphenylene oxide and polystyrene. The film 6 is preferably formed of the same material as the thermoplastic synthetic resin forming the molding body 2 or of material which is fusable together with such a synthetic resin so as to be bonded to the molding body 2 without adhesive material. The film 6 may be formed of material which is not fusable together with such a synthetic resin. In such a case, the film 6 is bonded to the molding body 2 with adhesive material.

The film 6 may be of a colored film, a film having a metallized layer thereon, or a film having printed layer thereon to enhance decorative effect.

As shown in FIG. 2, the hollow molding 1 thus formed is provided with a double sided tape 9. The tape 9 is applied on the bottom surface 5 of the molding body 2. As shown in FIG. 3, the hollow molding 1 is mounted on the automobile body 8 by the double sided tape 9.

Referring now to FIGS. 4 to 8, shown therein is blow molding apparatus for manufacturing the hollow molding 1.

Figure 4:
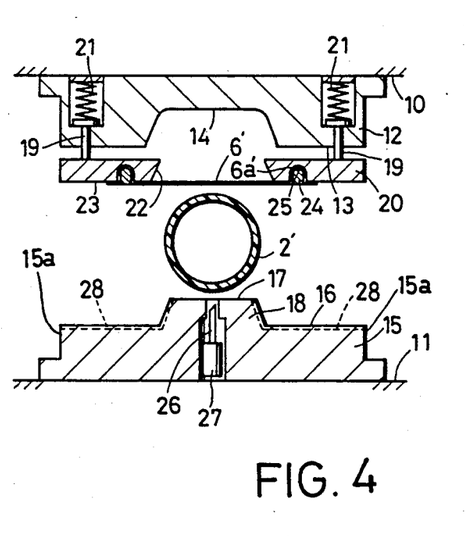
FIG. 4 is a transverse sectional view of blow molding apparatus in which a molding die is in an open position.

As shown in FIG. 4, the apparatus includes a molding die. The molding die has a first molding die member 12 and a second molding die member 15 which are mounted on a first die plate 10 and a second die plate 11, respectively. The first and second molding die members 12, 15 have a first mating surface 13 and a second mating surface 16, respectively. The first mating surface 13 of the first molding die member 12 is formed with a molding recess 14 which is configured to substantially conform to the configuration of the upper and side surfaces 3, 4 of the molding body 2. The second mating surface 16 of the second molding die member 15 is formed with a projection 18 which has a flat upper surface 17 which is configured to substantially conform to the configuration of the bottom surface 5 of the molding body 2.

The apparatus further includes an auxiliary molding die member 20 which has an opening 22 engageable with the projection 18 of the second molding die member 15 and which is positioned between the first molding die member 12 and the second molding die member 15. The auxiliary molding die member 20 is mounted on the first molding die member 12 by supporting rods 19 so as to move toward and away from the first mating surface 13. The rods 19 are provided with coil springs 21 by which the auxiliary molding die member 20 is normally biased in the direction away from the first mating surface 13.

The auxiliary molding die member 20 has an auxiliary mating surface 23 which is to be mated with the second mating surface 16 of the second molding die member 15 and which is adapted to be laid with a film material 6'. The mating surface 23 is formed with an engagement groove 25 into which an edge portion 6a' of the film material 6' is inserted and fixed by a frame member 24. The film material 6' is formed to form the ornamental film 6 of the hollow molding 1.

The second molding die member 15 is provided with an air supplier 27 having an air injection needle 26. The air supplier 27 is movably embedded in the second molding die member 15 so that the air injection needle 26 is moved between a projected position and a retracted position. The air supplier 27 is normally deenergized to keep the needle 26 in the retracted position. The second molding die member 15 is also formed with desired number of air relief grooves 28 which extend from the flat upper surface 17 to side walls 15a thereof.

Figure 5:
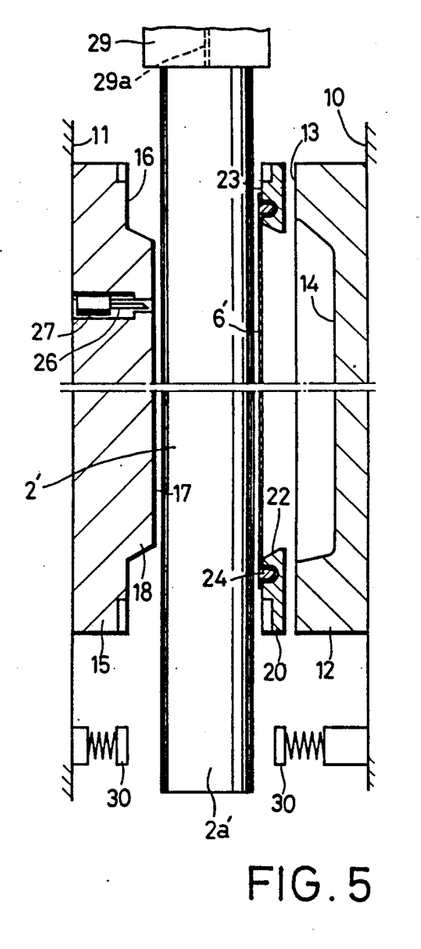
FIG. 5 is a vertical sectional view of FIG. 4.

As shown in FIG. 5, the molding apparatus include an extruder 19 to extrude molding material therefrom for forming a parison 2' and having an air feeding conduit 29a. The molding apparatus further includes a pair of pinching members 30 mounted on the first and second die plates 10, 11, respectively. The pinching members 30 are arranged such that a forward end 2a' of the parison 2' are pinched to close the forward end 2a' when the molding die is moved to a closed position.

The hollow molding 1 is manufactured by the above-described apparatus. The manufacturing process will now be described with reference to FIGS. 4 to 9.

FILM SUPPLYING STEP

As shown in FIG. 4, the first and second die plates 10, 11 are shifted so that the molding die is in an open position in which the first and second molding die members 12, 15 are separated form each other. Thereafter, the film material 6' is positioned on the auxiliary mating surface 23 of the auxiliary molding die member 20 so as to cover the opening 22. The edge portion 6a' of the film material 6' is recessed in the engagement groove 25 by the frame member 24, thereby to fix the film material 6' on the auxiliary mating surface 23.

PARISON FORMING STEP

As shown in FIGS. 4 and 5, the extruder 29 is operated to extrude a desired amount of molding material between the film material 6' provided on the auxiliary molding die member 20 and the flat upper surface 17 of the second molding die member 15, thereby to form the parison 2' therebetween.

FIRST DIE CLOSING STEP

Figure 6:
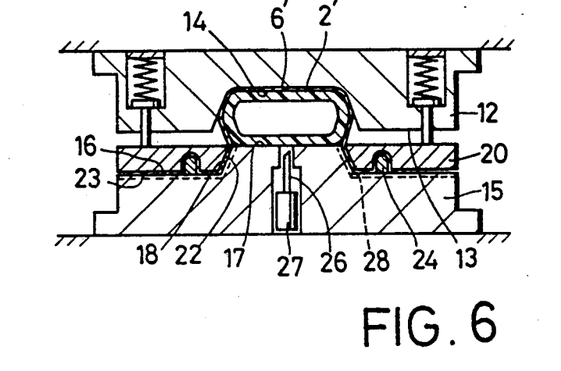
FIG. 6 is a transverse sectional view of the molding apparatus in which the molding die is in a half-closed position.

As shown in FIG. 6, the firs and second die plates 10, 11 are moved until the molding die reaches a half-closed position in which the mating surface 23 of the auxiliary molding die member 20 is mated with the second mating surface 16 of the second molding die member 15, but the first molding die member 12 is separated from the auxiliary molding die member 20. As will be appreciated, in the half-closed position, the projection 18 o the second molding die member 15 is engaged with the opening 22 of the auxiliary molding die member 20 in a manner that the film material 6' is sandwiched therebetween. Thus, the parison 2' stretches the film material 6' and passes through the opening 22 of the auxiliary molding die member 20 together with the stretched film material 6' thereby to be sifted between the molding recess 14 of the first molding die member 12 and the flat upper surface 17 of the second molding die member 15. Further, the forward end 2a' of the parison 2' is closed by the pinching members 30.

In this die closing step, desired air pressure is fed into the parison 2' from the air feeding conduit 29a to prevent the collapse of the parison 2' by the stretched film material 6' and to maintain the cylindrical configuration of the parison 2'.

SECOND DIE CLOSING STEP

Figure 7:
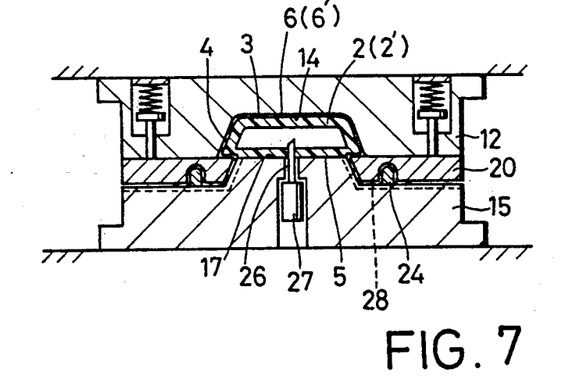
FIG. 7 is a transverse sectional view of the molding apparatus in which the molding die is in a completely closed position and air is blown into a parison.
Figure 8:
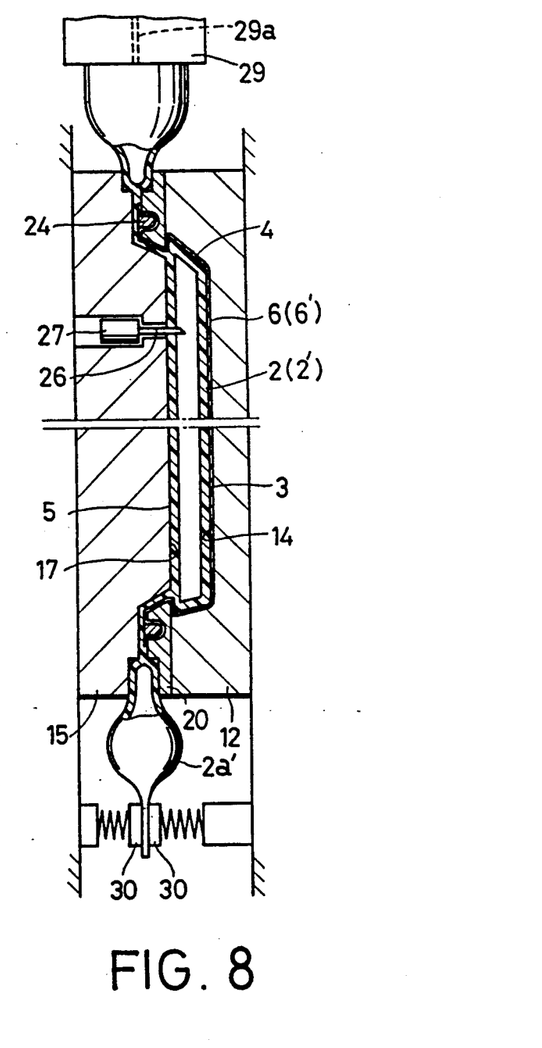
FIG. 8 is a vertical sectional view of FIG. 7.

As shown in FIGS. 7 and 8, the first and second die plates 10, 11 are further moved until the molding die reaches a completely closed position in which the mating surface 13 of the first molding die member 12 is in contact with the auxiliary molding die member 20.

AIR BLOWING STEP

As shown FIGS. 7 and 8, the air supplier 27 is energized to project the air injection needle 26 from the flat upper surface 17 of the projection 18 of the second molding die member 15, thereby permitting penetration of the air injection needle 26 into the parison 2'. Thereafter, air is fed to the air supplier 27 from an air source (not shown). The air fed into the air supplier 27 is subsequently blown into the parison 2' through the air injection needle 26 to form a molding product which comprises the hollow molding body 2 and the ornamental film 6 adhered to the upper and side surfaces 3, 4 of the molding body 2. After completion of formation of the molding product, the air supplier 27 is deenergized to retract the air injection needle 26 into the projection 18 of the second molding die member 15.

Further, as will be appreciated, the air trapped between the parison 2' and the film material 6' is effectively relieved through the air relief groove 28 to prevent formation of blisters onto the outer surface of the ornamental film 6 adhered to the molding body 2.

REMOVING STEP

Figure 9:
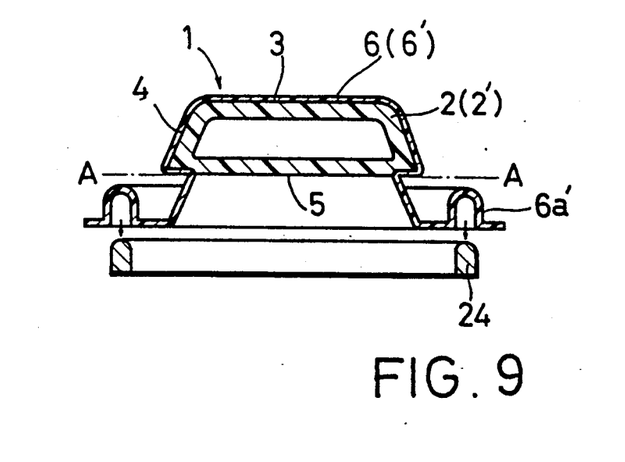
FIG. 9 is a sectional view of a molding product ejected from the molding die.

After completion of the air blowing step, the first and second die plates 10, 11 are moved until the molding die reaches the original open position, as shown in FIGS. 4 and 5. Subsequently, as shown in FIG. 9, the frame member 24 is disengaged from the engagement groove 25 of the auxiliary molding die member 20 to remove the molding product. As will be easily understood, in the removed molding product, the molding body 2 and the ornamental film 6 are accompanied with remainder portions of the parison 2' and the edge portion 6a' of the film material 6'.

Finally, the removed molding product is treated along the line A—A of FIG. 9 to cut off the remainder portions of the parison 2' and the edge portions 6a' of the film material 6', thereby to form the hollow molding 1 as described in FIGS. 1 and 2.

In the hollow molding 1 manufactured through the above described process, no wrinkle will appear on the ornamental film 6 adhered to the upper and side surfaces 3, 4 of the molding body 2. Therefore, the hollow molding 1 exhibits a good appearance.

Referring now to FIGS. 10 to 16, shown therein is a hollow molding 101 according to a second embodiment of the invention.

Figure 10:
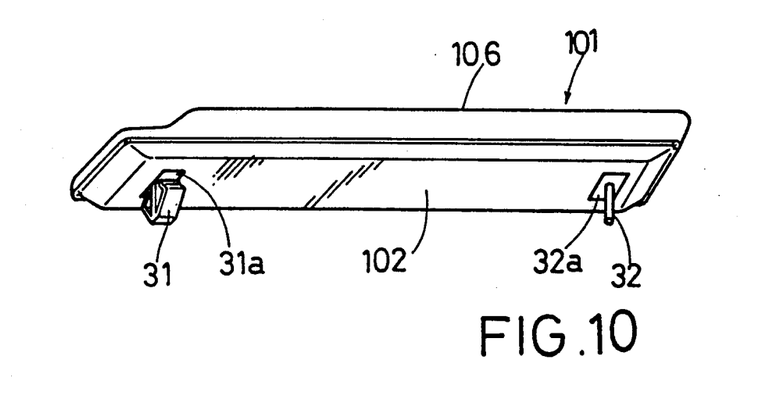
FIG. 10 is a perspective view of a hollow molding according to a second embodiment of the present invention.
Figure 11:
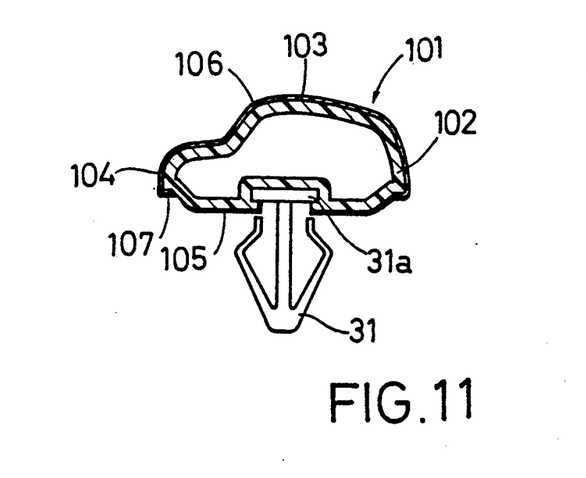
FIG. 11 is a sectional view of the hollow molding.

As shown in FIGS. 10 and 11, the hollow molding 101 comprises a hollow molding body 102 and an ornamental film 106 adhered on an upper surface 103 and side surface 104 of the molding body 102. As best shown in FIG. 11, the circumferential edge of the ornamental film 106 is folded toward a bottom surface 105 of the molding body 102 to form a folded edge 107. Further, the molding body 102 has an engagement leg member 31 having a head 31a which is embedded in the bottom surface 105 and has a securing bolt 32 having a head 32a which is embedded in the bottom surface 105.

The hollow molding body 102 is formed of the same material as the thermoplastic synthetic resin forming the molding body 2 of the first embodiment. Further, the film 106 is formed of the same material as the synthetic resin forming the film 6 of the first embodiment.

The hollow molding 101 thus formed is mounted on the automobile body (not shown) by the engagement leg member 31 and the securing bolt 32.

Referring now to FIGS. 12 to 16, shown therein is blow molding apparatus for manufacturing the hollow molding 101.

Figure 12:
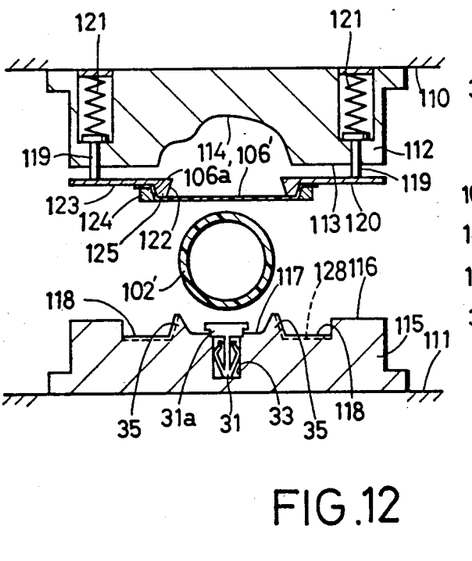
FIG. 12 is a transverse sectional view of blow molding apparatus in which a molding die is in an open position.

As shown in FIG. 12, the apparatus includes a molding die. The molding die has a first molding die member 112 and a second molding die member 115, which are mounted on a first die plate 110 and a second die plate 111, respectively. The first and second molding die members 112, 115 have a first mating surface 113 and a second mating surface 116, respectively. The first mating surface 113 of the first molding die member 112 is formed with a molding recess 114 which is configured to substantially conform to the configuration of the upper and side surfaces 103, 104 of the molding body 102. The second mating surface 116 of the second molding die member 115 is formed with a molding recess 117 which is configured to substantially conform to the configuration of the bottom surface 105 of the molding body 102, and is formed with an annular groove 118 which is separated from the molding recess 117 by an annual wall 34.

The apparatus further includes an auxiliary molding die member 120 which has an opening 122 engageable with the annular wall 34 of the second molding die member 115 and which is positioned between the first molding die member 112 and the second molding die member 115. The auxiliary molding die member 120 is mounted on the first molding die member 112 by supporting rods 119 so as to move toward and away from the first mating surface 113. The rods 119 are provided with coil springs 121 by which the auxiliary molding die member 120 is normally biased in the direction away from the first mating surface 113.

The auxiliary molding die member 120 has an auxiliary mating surface 123 which is to be mated with the second mating surface 116 of the second molding die member 115 and which is adapted to be laid with a film material 106'. The mating surface 123 is formed with an engagement portion 125 to which an edge portion 106a' of the film material 106' is engaged and fixed by a frame member 124.

Figure 13:
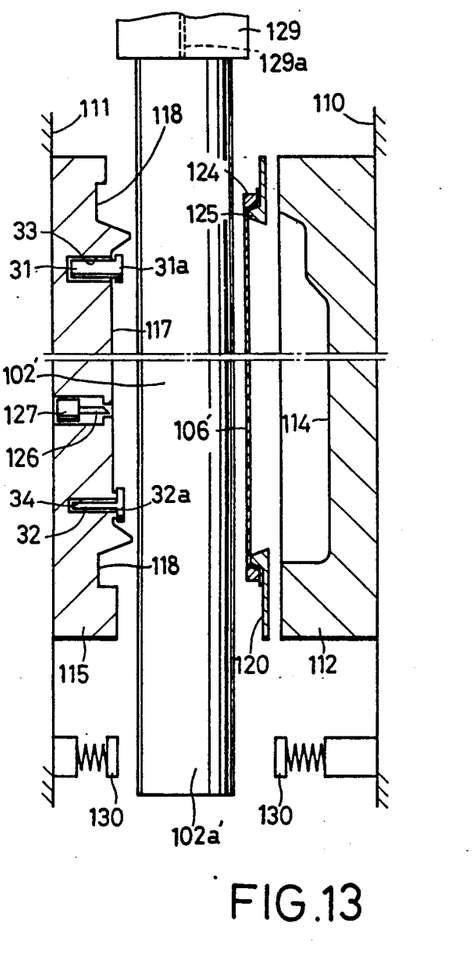
FIG. 13 is a vertical sectional view of FIG. 12.

As shown in FIG. 13, the second molding die member 115 is provided with an air supplier 127 having an air injection needle 126. The air supplier 127 is movably embedded in the second molding die member 115 so that the air injection needle 126 is moved between a projected position and a retracted position. The air supplier 127 is normally deenergized to keep the needle 126 in the retracted position. The second molding die member 115 is also formed with desired number of air relief grooves 128 which extend from the top of the wall 34 and transverse the annular groove 118. Further, as shown in FIGS. 12 and 13, the second molding die member 115 is formed with a pair of bores 33, 34 into which the engagement leg member 31 and the securing bolt 32 are arranged, respectively.

As shown in FIG. 13, the molding apparatus includes an extruder 129 to extrude molding material therefrom for forming a parison 102' and having an air feeding conduit 129a. The molding apparatus further includes a pair of pinching members 130 mounted on the first and second die plates 110, 111, respectively. The pinching members 130 are arranged such that a forward end 102a' of the parison 102' are pinched to close the forward end 102a' when the molding die are moved to a closed position.

The hollow molding 101 is manufactured by the above-described apparatus. The manufacturing process will now be described with reference to FIGS. 12 to 16.

FILM SUPPLYING STEP

As shown in FIG. 12, the first and second die plates 110, 111 are moved so that the molding die is in an open position in which the first and second molding die members 112, 115 are separated from each other. Thereafter, the film material 106' is positioned on the auxiliary mating surface 123 of the auxiliary molding die member 120 so as to cover the opening 122. The edge portion 106a' of the film material 106' is engaged with the engagement portion 125 by the frame member 124, thereby to fix the film material 106' on the auxiliary molding die ember 120. Further, as shown if FIGS. 12 and 13, the engagement leg member 31 and the securing bolt 32 are arranged in the bores 33, 34, respectively, so that the heads 31a, 32a thereof are projected into the molding recess 117.

PARISON FORMING STEP

As shown in FIGS. 12 and 13, the extruder 129 is operated to extrude a desired amount of molding material between the film material 106' provided on the auxiliary molding die member 120 and the molding recess 117 of the second molding die member 115, thereby to form the parison 102' therebetween.

FIRST DIE CLOSING STEP

Figure 14:
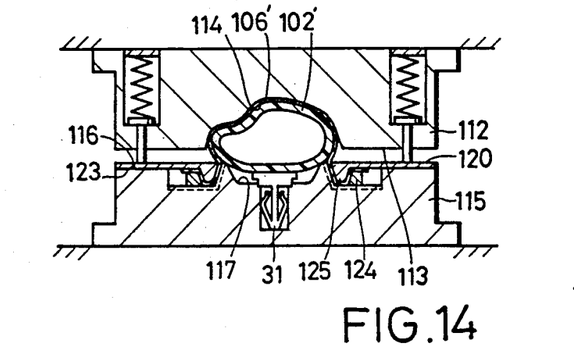
FIG. 14 is a transverse sectional view of the molding apparatus in a half-closed position.

As shown in FIG. 14, the first and second die plates 110, 111 are moved until the molding die reaches a half-closed position in which the mating surface 123 of the auxiliary molding die member 120 is mated with the second mating surface 116 of the second molding die member 115, but the first molding die member 112 is separated from the auxiliary molding die member 120. A swill be appreciated, in the half-closed position, the annular wall 35 of the second molding die member 115 is engaged with the opening 122 of the auxiliary molding die member 120 in a manner that the film material 106' is sandwiched therebetween. Thus, the parison 102' stretches the film material 106' and passes through the opening 122 of the auxiliary molding die member 120 together with the stretched film material 106' thereby to be shifted between the molding recess 114 of the first molding die member 112 and the molding recess 1187 of the second molding die member 115. Further, the forward end 102a' of the parison 102' is closed by the pinching members 130.

In this die closing step, desired air pressure is fed into the parison 102' from the air feeding conduit 129a to prevent the collapse of the parison 102' by the stretched film material 106' and to maintain the cylindrical configuration of the parison 102'.

SECOND DIE CLOSING STEP

Figure 15:
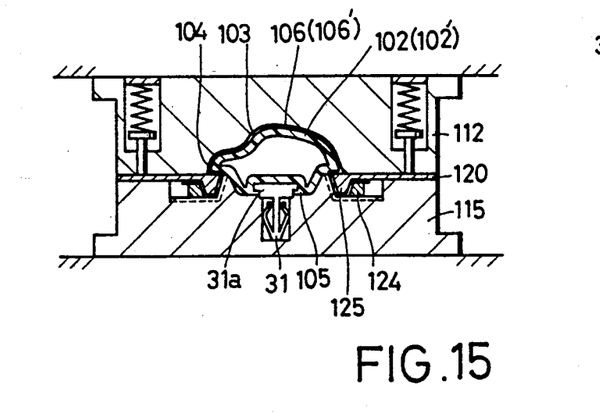
FIG. 15 is a transverse sectional view of the molding apparatus in which the molding is in a completely closed position and air is blown into a parison.
Figure 16:
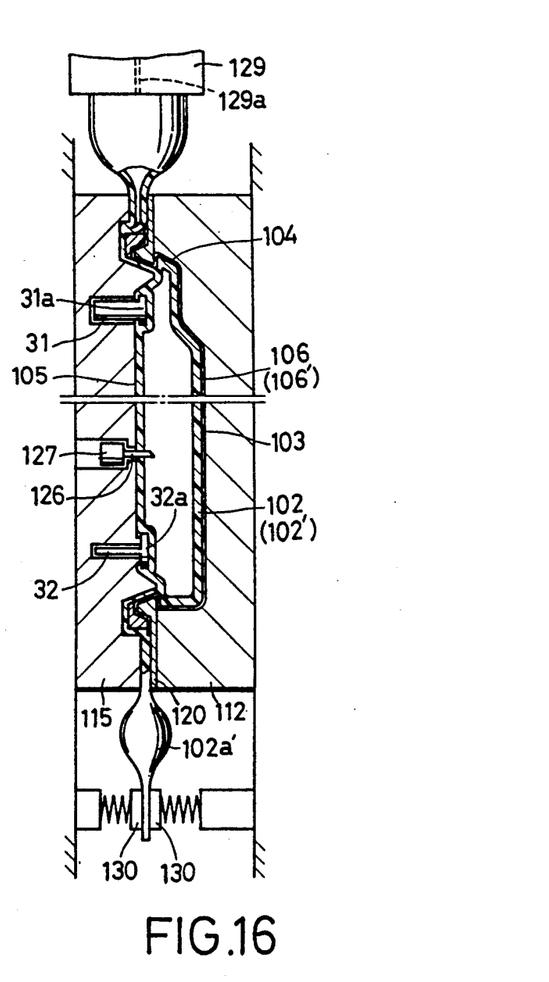
FIG. 16 is a vertical sectional view of FIG. 15.

As shown in FIGS. 15 and 16, the first and second die plates 110, 111 are further moved until the molding die reaches a completely closed position in which the mating surface 113 of the first molding die member 112 is in contact with the auxiliary molding die member 120.

AIR BLOWING STEP

As shown FIGS. 15 and 16, the air supplier 127 is energized to project the air injection needle 126 into the molding recess 117 of the second molding die member 115, thereby permitting penetration of the air injection needle 126 into the parison 102'. Thereafter, air is fed to the air supplier 127 from an air source (not shown). The air fed into the air supplier 127 is subsequently blown into the parison 102' through the air injection needle 126 to form a molding product which comprises the hollow molding body 102 and the ornamental film 106 adhered to the upper and side surfaces 103, 104 of the molding body 102.

Further, in the air blowing step, the heads 31a, 32a of the leg member 31 and the bolt 32 are embedded into the molding body 102. Thus, the leg member 31 and the bolt 32 are effectively fixed to the molding body 102.

REMOVING STEP

After completion of the air blowing step, the first and second die plates 110, 111 are moved until the molding die reaches the original open position, as shown in FIGS. 12 and 13. Subsequently, the frame member 124 is disengaged from the engagement portion 125 of the auxiliary molding die member 120 to remove the molding product.

Finally, the removed molding product is treated to cut off the remainder portions of the parison 102' and the edge portion 106a' of the film material 106', thereby to form the hollow molding 101 as described in FIGS. 10 and 11.

The preferred embodiments herein described are intended to be illustrative of the invention and to limit the invention to the precise form herein described. They are chosen and described to explain the principles of the invention and their application and practical use to enable others skilled in the art to practice the invention.

What is claimed is:

1. A molding for use with an automobile comprising a hollow molding body formed by blow molding and including external top, side and bottom surfaces, and an ornamental film layer adhered to the external upper and side surfaces of said hollow molding body, the ornamental film layer being adhered during blow molding of the hollow molding body.

2. The molding as defined in claim 1 wherein said molding body and said ornamental film layer are both formed of a thermoplastic synthetic resin.

3. The molding as defined in claim 2, wherein the thermoplastic synthetic resin is selected from the group consisting of polyethylene, polypropylene and a mixture of polyphenylene oxide and polystyrene.

4. The molding as defined in claim 1, additionally comprising a leg member and a securing bolt embedded in and protruding outwardly from said bottom surface, said leg member and securing bolt being embedded in said bottom surface during blow molding of the hollow molding body.

5. A process for manufacturing a molding comprising a hollow molding body including external upper, side and bottom surfaces, and an ornamental film layer adhered to the external upper and side surfaces of the hollow molding body, comprising the steps of:
providing a molding die including a first molding die member having a first molding surface to form the external upper and side surfaces of the hollow molding body and including a second molding die member having a second molding surface to form the bottom surface of the hollow molding body;
moving said molding die to an open position in which said first and second molding die members are separated from each other;
arranging a film material to be formed as the ornamental film layer adjacent and in generally covering relationship with said first molding surface;
extruding molding material to form a parison to be formed as the hollow molding body between said film material and said second molding surface;
moving said molding die to a closed position in which said first and second molding die members are in contact with each other; and
feeding air pressure into said parison to form the hollow molding body and simultaneously adhere said film material to the external upper and side surfaces of the hollow molding body for forming the ornamental film layer thereon.

6. The process as defined in claim 5, wherein said first molding die member further includes an auxiliary molding die member movably mounted thereon, and positioned between said first molding surface and said second molding die member, wherein said auxiliary molding die member has an opening corresponding to said first molding surface with a diameter permitting the passage of said parison therethrough, and wherein the step of arranging the film material comprises providing said film material on said auxiliary molding die member so as to cover said opening.

7. The process as defined in claim 5 wherein said feeding of air pressure into said parison is performed through an air supply means retractably mounted on said second molding die member.

8. The process as defined in claim 6 further comprising the step of arranging an engagement leg member and a securing bolt on said second molding surface of said second molding die member prior to the step of moving said molding die to said closed position, so that said leg member and said securing bolt are embedded in the external bottom surface of said hollow molding body during formation of said hollow molding body.

9. A molding comprising a hollow molding body including external upper, side and bottom surfaces, and an ornamental film layer adhered to the external upper and side surfaces of the hollow molding body, formed by a process comprising the steps of:

providing a molding die including a first molding die member having a first molding surface to form the external upper and side surfaces of the hollow molding body and including a second molding die member having a second molding surface to form the bottom surface of the hollow molding body;

moving said molding die to an open position in which said first and second molding die members are separated from each other;

arranging a film material to be formed as the ornamental film layer adjacent and in generally covering relationship with said first molding surface;

extruding molding material to form a parison to be formed as the hollow molding body between said film material and said second molding surface;

moving said molding die to a closed position in which said first and second molding die members are in contact with each other; and feeding air pressure into said parison to form the hollow molding body and simultaneously adhere said film material to the external upper and side surfaces of the hollow molding body for forming the ornamental film layer thereon.

* * * * *